United States Patent [19]
Ogura

[11] Patent Number: 4,950,968
[45] Date of Patent: Aug. 21, 1990

[54] DC MOTOR DRIVING APPARATUS WITH FUNCTION FOR COMPENSATING FOR DRIVE VOLTAGE CHANGE

[75] Inventor: Masahiko Ogura, Yokohama, Japan

[73] Assignee: Kabushiki Kaisha Toshiba, Kawasaki, Japan

[21] Appl. No.: 284,411

[22] Filed: Dec. 14, 1988

[30] Foreign Application Priority Data

Dec. 18, 1987 [JP] Japan ................. 62-320417

[51] Int. Cl.[5] .......................... H02P 5/17; H02P 6/02
[52] U.S. Cl. ..................................... 318/599; 318/254
[58] Field of Search ................................. 318/599, 254

[56] References Cited

U.S. PATENT DOCUMENTS

| | | | |
|---|---|---|---|
| 4,368,411 | 1/1983 | Kidd | 318/254 |
| 4,651,068 | 3/1987 | Meshkat-Razavi | 318/254 |
| 4,686,437 | 8/1987 | Langley et al. | 318/254 |
| 4,749,927 | 6/1988 | Rodal et al. | 318/599 |

FOREIGN PATENT DOCUMENTS

| | | | |
|---|---|---|---|
| 3218448 | 11/1983 | Fed. Rep. of Germany | 318/599 |
| 57-31306 | 2/1982 | Japan | 318/599 |
| 58-19903 | 2/1983 | Japan | 318/599 |
| 62-247786 | 10/1987 | Japan | 318/599 |

OTHER PUBLICATIONS

Toshiba TA7712P, pp. 198-206.
Toshiba TA76494P, pp. 370-374.
Toshiba TC9142), pp. 355-368.

Primary Examiner—Bentsu Ro
Attorney, Agent, or Firm—Foley & Lardner, Schwartz, Jeffery, Schwaab, Mack, Blumenthal & Evans

[57] ABSTRACT

A motor driving apparatus disclosed herewith is designed in such a way that a drive current is supplied through a switching circuit to a DC motor, such as a three-phase brushless motor, from a DC power source and the rotational speed and phase of a signal has a frequency proportional to the rotational speed of the DC motor are detected by a rotational speed detector and a phase detector. Signals detected by the speed detector and phase detector are respectively supplied to a speed comparator and a phase comparator for comparison with the respective predetermined values. The comparison results are then added and the resultant signal is sent to a subtracter. The applied voltage of the DC motor which has undergone ON/OFF control in a switching circuit is detected by a voltage detector, and the detection signal is subtracted from the added signal in the subtracter, and the resultant signal is supplied as a control signal to a signal generator. This signal generator changes the ratio of the ON/OFF signal supplied to the switching circuit in accordance with the control signal from the subtracter, whereby the ON/OFF time of the switching circuit is controlled to thereby control the rotational speed and phase of the DC motor.

9 Claims, 4 Drawing Sheets

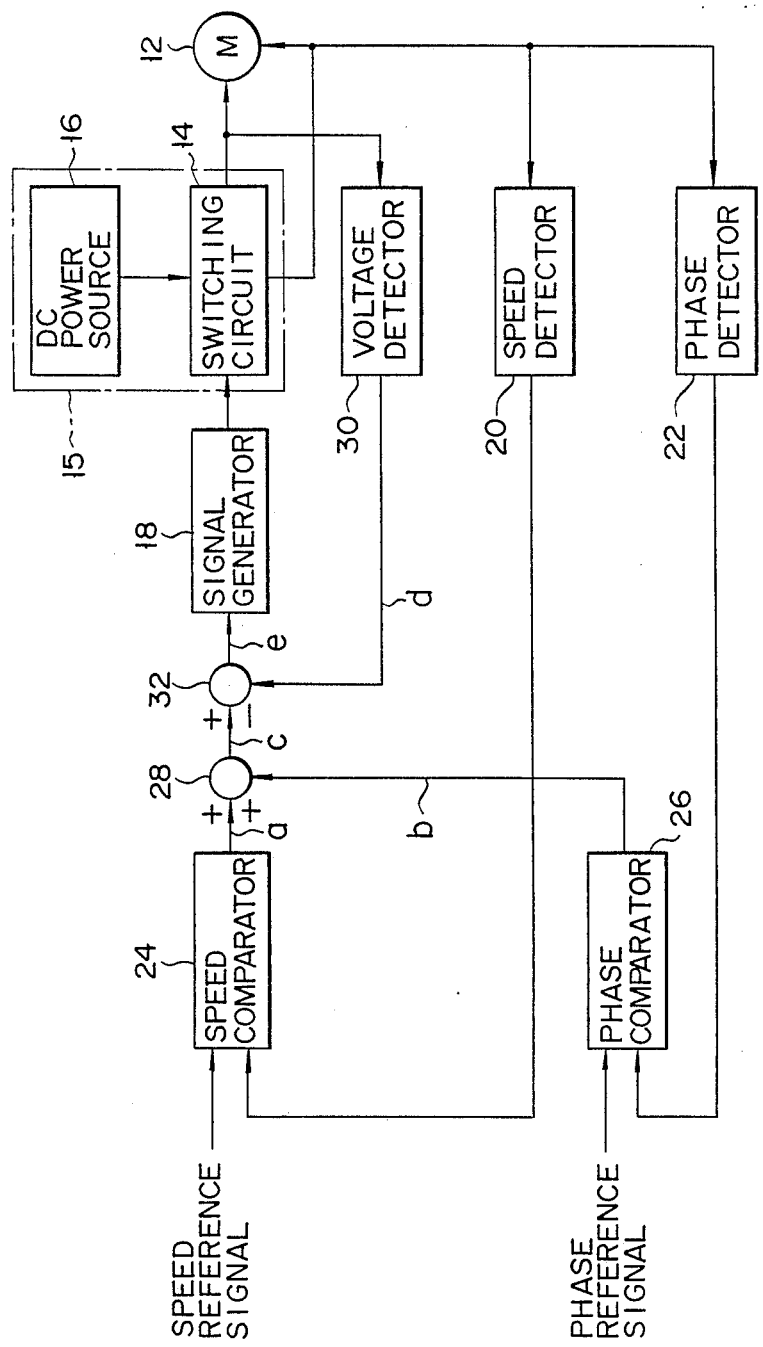
F I G. 1

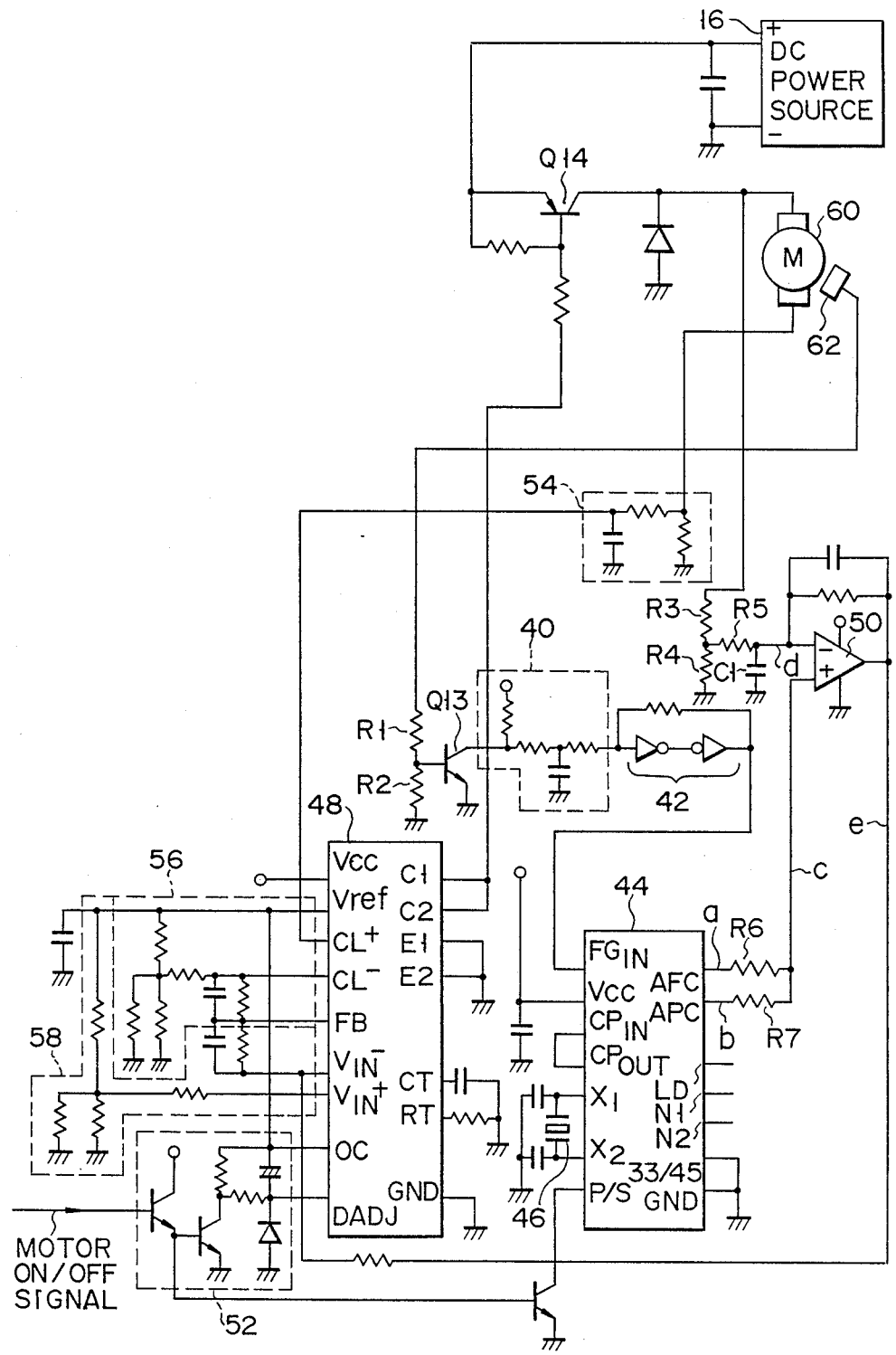
F I G. 4

DC MOTOR DRIVING APPARATUS WITH FUNCTION FOR COMPENSATING FOR DRIVE VOLTAGE CHANGE

BACKGROUND OF THE INVENTION

1. Field of the Invention

The present invention relates to a DC motor driving apparatus, and more particularly, to a DC motor driving apparatus which drives a DC motor such as a three-phase brushless motor and performs the function of compensating for a change in drive voltage.

2. Description of the Related Art

Generally, with regard to a DC motor, given that the voltage applied thereto is constant, its rotational speed decreases with an increase in the load torque, and with the load torque being constant, the rotational speed is substantially proportional to the applied voltage. A DC motor having such a characteristic is used as, for example, a toner motor in a developer for use in a copying machine. A DC motor driving apparatus having the following structure is known as a driving apparatus for such a DC motor which can maintain the rotational speed of the motor even when the source voltage or load torque is changed.

The above type of DC motor is supplied with a drive current from a DC power source, and the supply of this drive current is controlled by a switching circuit. The switching operation of the switching circuit is controlled by an ON/OFF signal produced from a signal generator, thus controlling the current supplied to the DC motor. The rotational speed of the DC motor is detected by a rotational speed detector that uses a frequency generator, etc., and a frequency signal proportional to the rotational speed of the DC motor is acquired from the detector and is converted into a voltage value before being supplied to a speed comparator. The speed comparator compares the output signal (voltage value) of the speed detector with a predetermined speed reference signal (voltage value) and supplies a control signal corresponding to the difference between these two signals to the signal generator. In accordance with this control signal, the signal generator changes the duty (ON/OFF ratio) of the ON/OFF signal that should be supplied to the switching circuit. This controls the ON/OFF time of the switching circuit, thereby controlling the rotational speed of the DC motor.

With regard to a DC motor driving apparatus that performs a phase synchronizing control, a phase detector, phase comparator and adder are added in parallel to the aforementioned speed detector, so that both the rotational speed and phase of the DC motor are controlled.

More specifically, a frequency signal proportional to the rotational speed of the DC motor is acquired by means of the phase detector using a frequency generator, etc. and it is then supplied to the phase comparator. The phase comparator compares the phase of the output signal of the phase detector with that of a predetermined reference signal (reference frequency signal) and supplies a control signal corresponding to the phase difference of these two signals to the adder. The adder then adds the control signal from the speed comparator and the control signal from the phase comparator and supplies the resultant signal as a control signal to the signal generator.

With a thus constituted conventional DC motor driving apparatus, however, the control signal generated from the signal generator to control the rotational speed of the DC motor does not vary unless the rotational speed or phase of the motor actually changes due to a change in voltage from the power source or load of the motor. Further, in a case where a non-stable power source of lower cost than that of a stable power source is used as the mentioned power source or where the source voltage is changed with another load than the motor being coupled to the same power source that drives the motor, since the control signal from the signal generator determines only the ON/OFF duty, it is influenced by the non-stable power source or the mentioned load other than the motor. In other words, with the use of the non-stable power source as the actual power source, the voltage after the ON/OFF control is executed using the control signal may be varied or the voltage after the ON/OFF control may be varied due to a change in current which is caused by the influence of the load other than the motor. As a result, the rotational speed of the motor cannot be properly be controlled and may easily be changed.

SUMMARY OF THE INVENTION

Accordingly, it is an object of this invention to provide a DC motor driving apparatus that can significantly improve a change in rotational speed of a DC motor with respect to a change in source voltage and can therefore ensure simplification of the power source in use, which would reduce the manufacturing cost and make the apparatus more compact and lighter.

According to one aspect of this invention, there is provided a DC motor driving apparatus for controlling the speed of the DC motor which is changed by energy supplied to the DC motor comprising means for providing the energy to the DC motor, first means for detecting the energy supplied to the DC motor by the providing means and generating a first signal corresponding to the energy, second means for detecting a second signal corresponding to the rotation of the DC motor, means for comparing the second signal detected by the second detecting means with a reference signal, and means for controlling the providing means to compensate for a change of the energy provided by the providing means on the basis of the first signal and the comparison resulting from the comparing means.

According to another aspect of this invention, there is provided a DC brush motor driving apparatus for controlling the speed of the DC brush motor which is changed by energy supplied to the DC brush motor comprising means for providing the energy to the DC brush motor, voltage detecting means, provided between a reference potential point and a stator of the DC brush motor, for detecting a drive voltage supplied to the DC brush motor, means for generating an electric signal corresponding to rotation of the DC brush motor, first integrated circuit means, having a crystal oscillator, for comparing the electric signal from the signal generating means with a reference signal obtained by frequency-dividing an output signal of the crystal oscillator, synthesizing means for synthesizing a voltage detection signal from the voltage detecting means with a comparison result of the first integrated circuit means, and second integrated circuit means for generating a switching signal based on an output of the synthesizing means and supplying the switching signal to the providing means so as to compensate for a change in the drive voltage supplied by the providing means.

According to a further aspect of this invention, there is provided a DC motor driving apparatus for controlling the speed of the DC motor which is changed by energy supplied to the DC motor comprising a Hall effect element provided in association with a winding to detect a rotor position of the DC motor, first integrated circuit means for detecting a position of a rotor of the DC motor upon reception of a voltage from the Hall effect element, switching means for performing a switching operation to supply a DC source voltage to the winding of the DC motor, voltage detecting means, provided between a reference potential point and the winding of the DC motor, for detecting a drive voltage supplied to the DC motor, means for generating an electric signal corresponding to rotation of the DC motor upon reception of an output signal of the first integrated circuit means, second integrated circuit means, having a crystal oscillator, for comparing the electric signal from the signal generating means with a reference signal obtained by frequency-dividing an output signal of the crystal oscillator, synthesizing means for synthesizing a voltage detection signal from the voltage detecting means with a comparison result of the second integrated circuit means, and third integrated circuit means for generating a switching signal based on an output of the synthesizing means and supplying the switching signal to the providing means so as to compensate for a change in the drive voltage supplied by the switching means.

BRIEF DESCRIPTION OF THE DRAWINGS

The aforementioned aspects and other features of this invention will be explained in the following description, taken in conjunction with the accompanying drawings wherein:

FIG. 1 is a block diagram illustrating the arrangement of a DC motor driving apparatus according to one embodiment of this invention;

FIG. 4 is a circuit diagram illustrating another embodiment of this invention according to which the DC motor driving apparatus of FIG. 1 is applied to a one-phase brush motor.

DETAILED DESCRIPTION OF THE PREFERRED EMBODIMENTS

Figure 2:
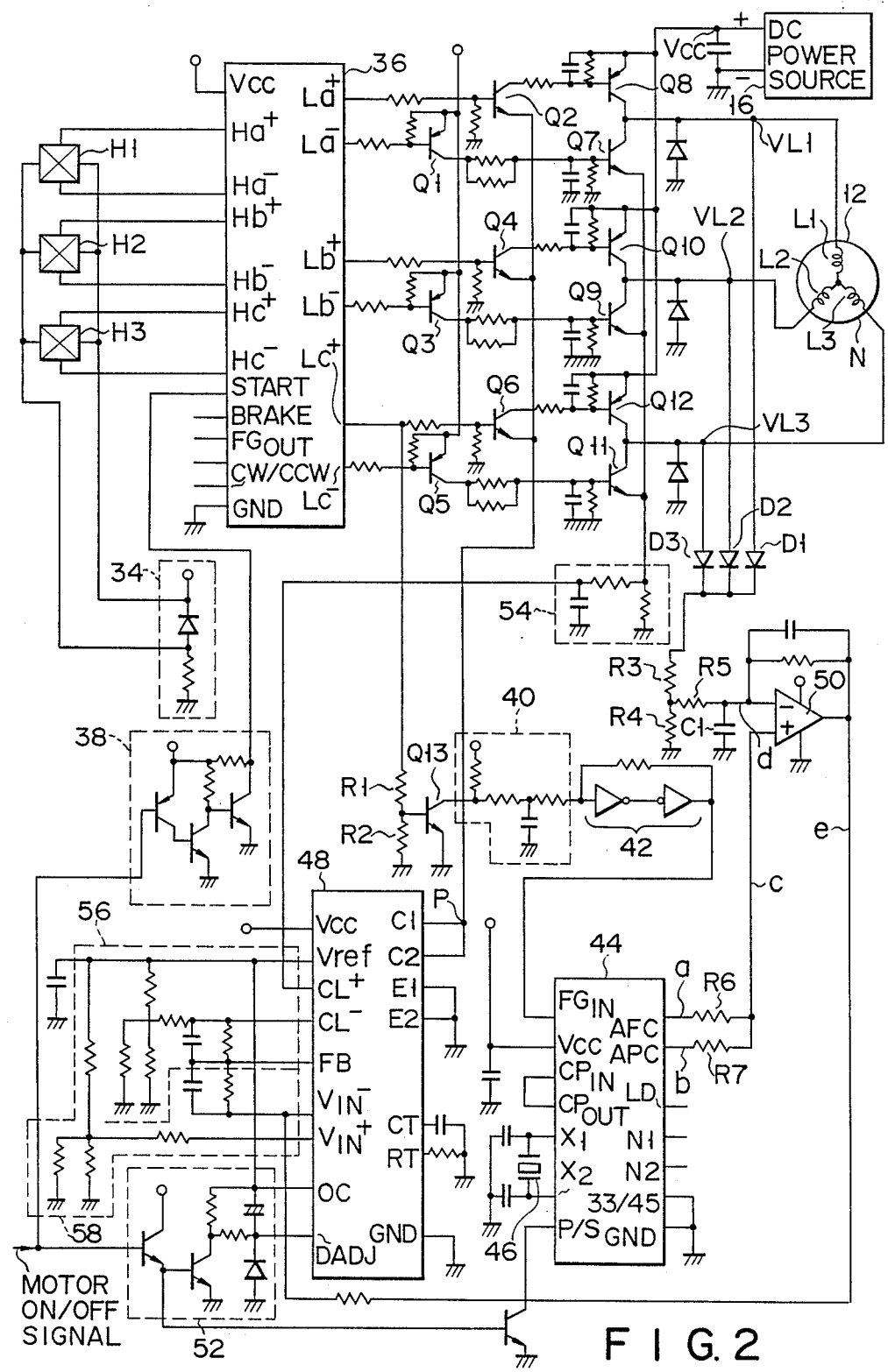
FIG. 2 is a circuit diagram illustrating the DC motor driving apparatus of FIG. 1 being applied to a three-phase brushless motor.

Preferred embodiments of this invention will be described below with reference to the accompanying drawings.

In FIG. 1, DC motor 12 is supplied with a drive current from DC power source 16 through switching circuit 14. Switching circuit 14 and DC power source 16 constitute a switching regulator 15 which performs the ON/OFF control of the current supplied to DC motor 12. Switching circuit 14 executes the ON/OFF operation of the current to DC motor 12 in accordance with an ON/OFF signal (which will be described later) generated from signal generator 18. The rotational speed and phase of DC motor 12 are respectively detected by rotational speed detector 20 and phase detector 22. These detectors 20 and 22 may each be constituted by a frequency generator or the like. Speed detector 20 acquires a frequency signal proportional to the rotational speed of DC motor 12 and converts the signal into a voltage value. The rotational speed and phase of DC motor 12 are respectively supplied to speed comparator 24 and phase comparator 26 in terms of the output signals of detectors 20 and 22 which correspond to the actual rotational speed and phase.

Speed comparator 24 compares the output signal of speed signal detector 20 with a predetermined speed reference signal (voltage value) supplied from, for example, a microcomputer (not shown) to provide a control signal a corresponding to the difference between these two signals. This control signal a is supplied to adder 28. Similarly, phase comparator 26 compares the output signal from phase detector 22 with a predetermined reference signal (reference frequency signal) supplied from, for example, a microcomputer (not shown) to provide a control signal b corresponding to the phase difference originated from this phase comparison. The control signal b is then supplied to adder 28.

The voltage supplied to DC motor 12 after being subjected to ON/OFF control by switching circuit 14 is detected by voltage detector (voltage detecting means) 30. This voltage detector 30 produces a signal (effective value or averaged value) proportional to the voltage supplied to DC motor 12 through switching regulator 15 and sends the produced signal as its output signal d to subtracter (arithmetic unit means) 32.

Subtracter 32 performs a subtraction between the control signal c from adder 28 and the output signal d of voltage detector 30. That is, subtracter 32 subtracts the output signal d from the control signal c and sends the resultant signal as a control signal (voltage value) e to signal generator 18. In this manner, a negative feedback is applied to signal generator 18 and switching circuit 14.

In other words, signal generator 18 changes the ON/OFF ratio or ON/OFF time of switching circuit 14 in accordance with the control signal e from subtracter 32, thereby controlling the rotational speed and phase of DC motor 12.

FIG. 2 illustrates an example of the circuit configuration of the DC motor driving apparatus shown in FIG. 1 which is applied to, for example, a three-phase brushless motor. DC motor 12, which is a three-phase brushless motor, has three-phase coils L1, L2 and L3 and three Hall effect elements H1, H2 and H3 provided in association with these three coils to detect the rotor position of the motor. Hall elements H1, H2 and H3 are supplied with an operation voltage from power source circuit 34. IC (integrated circuit) 36 is an integrated circuit for motor control (e.g., TOSHIBA TA7712P) and outputs excitation signals in accordance with the outputs of Hall elements H1, H2 and H3. IC 36 drives transistors Q1 to Q12 coupled as shown in FIG. 2 in order to excite coils L1 to L3 of DC motor 12 by means of the excitation signals. Transistors Q8, Q10 and Q12 are coupled to DC power source 16 so that the voltage from the power source 16 is supplied DC motor 12 through these transistors Q8, Q10 and Q12. IC 36 has a START terminal supplied with motor ON/OFF (start/stop) signal through a signal inverter 38. That is, transistors Q1 to Q12 constitute the aforementioned switching circuit 14 and these transistors Q1–Q12 and DC power source 16 constitute switching regulator 15 (refer to FIGS. 1 and 2).

One of the excitation signals (Lc in FIG. 2) from IC 36 is detected to be a speed detection signal by a combination of resistors R1 and R2 and transistor Q13. This speed detection signal is sent from the output side of transistor Q13 to filter 40 for removal of a noise component and is then sent to wave shaper 42 to be subjected to wave shaping. The resultant signal is then supplied to IC 44 which is an integrated circuit (e.g., TOSHIBA TC9142P) for use in speed control. This IC 44 receives at its FG pulse input terminal $FG_{IN}$ the speed detection signal from IC 36 which represents the number of rotations of DC motor 12. IC 44 also changes outputs AFC (control signal a) and APC (control signal b) from output terminals AFC and APC of the speed control system and phase control system in such a way that the speed detection signal becomes equal to the reference clock from crystal oscillator 46 coupled between a crystal oscillator terminals $X_1$ and $X_2$ which is subjected to frequency division. Resistors R1 and R2, transistor Q13, filter 40, wave shaper 42 and IC 44 constitute the aforementioned speed detector 20, speed comparator 24, phase detector 22 and phase comparator 26 (refer to FIGS. 1 and 2). The aforementioned speed reference signal and phase reference signal respectively supplied to speed comparator 22 and phase comparator 26 are based on a reference clock from a crystal oscillator 46.

IC 48 is an integrated circuit (e.g., TOSHIBA TA76494P) for a switching regulator and constitutes the aforementioned signal generator 18, as shown in FIG. 1. This IC 48 changes the ON/OFF duty cycles of outputs $C_1$ and $C_2$ in accordance with a value at an input terminal $V_{IN}-$. The ON/OFF signals from outputs $C_1$ and $C_2$ render transistors Q1 to Q6 conductive or nonconductive and further render transistors Q7 to Q12 conductive or nonconductive, so that switching circuit 14 can perform the ON/OF control of the supply of the current to DC motor 12 from DC power source 16. After the ON/OFF control, the voltages to be supplied to coils L1 to L3 of DC motor 12 are rectified by diodes D1, D2 and D3 serving as rectifiers. The rectified voltages are then smoothed to be the aforementioned signal d by resistors R3, R4 and R5 and capacitor C1 and this signal d is supplied to a minus input terminal of operational amplifier 50 that constitutes subtractor 32 (shown in FIG. 1). These diodes D1-D3, resistors R3-R5 and capacitor C1 constitute the aforementioned voltage detector 30, as shown in FIG. 1. IC 48 is supplied with the motor ON/OFF signal from an external unit (not shown) through soft start controller 52 that controls the soft start at the time of starting the motor.

The aforementioned outputs AFC and APC of IC 44 are added to be the control signal c by adder 28 (shown in FIG. 1) which is constituted by resistors R6 and R7, and the signal c is supplied to a plus input terminal of operational amplifier 50. Operational amplifier 50 in turn subtracts the signal d from the control signal c and sends its output as the control signal e to input terminal $V_{IN}-$ of IC 48. This feedback control of the voltage supplied to DC motor 12 always sets the voltage to the motor 12 at a value corresponding to the speed control signal irrespective of a change in source voltage. Accordingly, stable speed control can always be realized.

In FIG. 2, reference numeral 54 denotes a current detector that detects the coil current of DC motor 12 and outputs the corresponding voltage signal, and reference numeral 56 denotes a reference voltage generator that generates a reference voltage for detecting an excess current at the time DC motor 12 is started or locked. The output voltages of the individual circuits 54 and 56 are respectively supplied to input terminals CL+ and CL− of IC 48. These input terminals CL+ and CL− serve as the input terminals of an excess current detecting comparator provided within IC 48, and the stopping operation, etc. of DC motor 12 is executed by detecting an excess current through this comparator. Reference numeral 58 is an input circuit of an amplifier provided within IC 48 to amplify the control signal e and the input circuit is coupled to input terminals $V_{IN}-$ and $V_{IN}+$ (input terminals of this amplifier) of IC 48.

Referring now to FIGS. 3A through 3I, a description will be given of the operation of the thus constituted DC motor driving apparatus. Reference numerals Vcc, VL1, VL2, VL3, c, d, e, P and N given in FIG. 2 correspond to the individual waveforms shown in FIGS. 3A through 3I; Vcc is a voltage of DC power source 16, VL1 to VL3 are the voltages of the respective coils L1 to L3, c, d and e represent the voltages of the control signals c, d and e, and P and N respectively represent the output voltages of IC 48 (signal generator 18) and DC motor 12.

Figure 3:
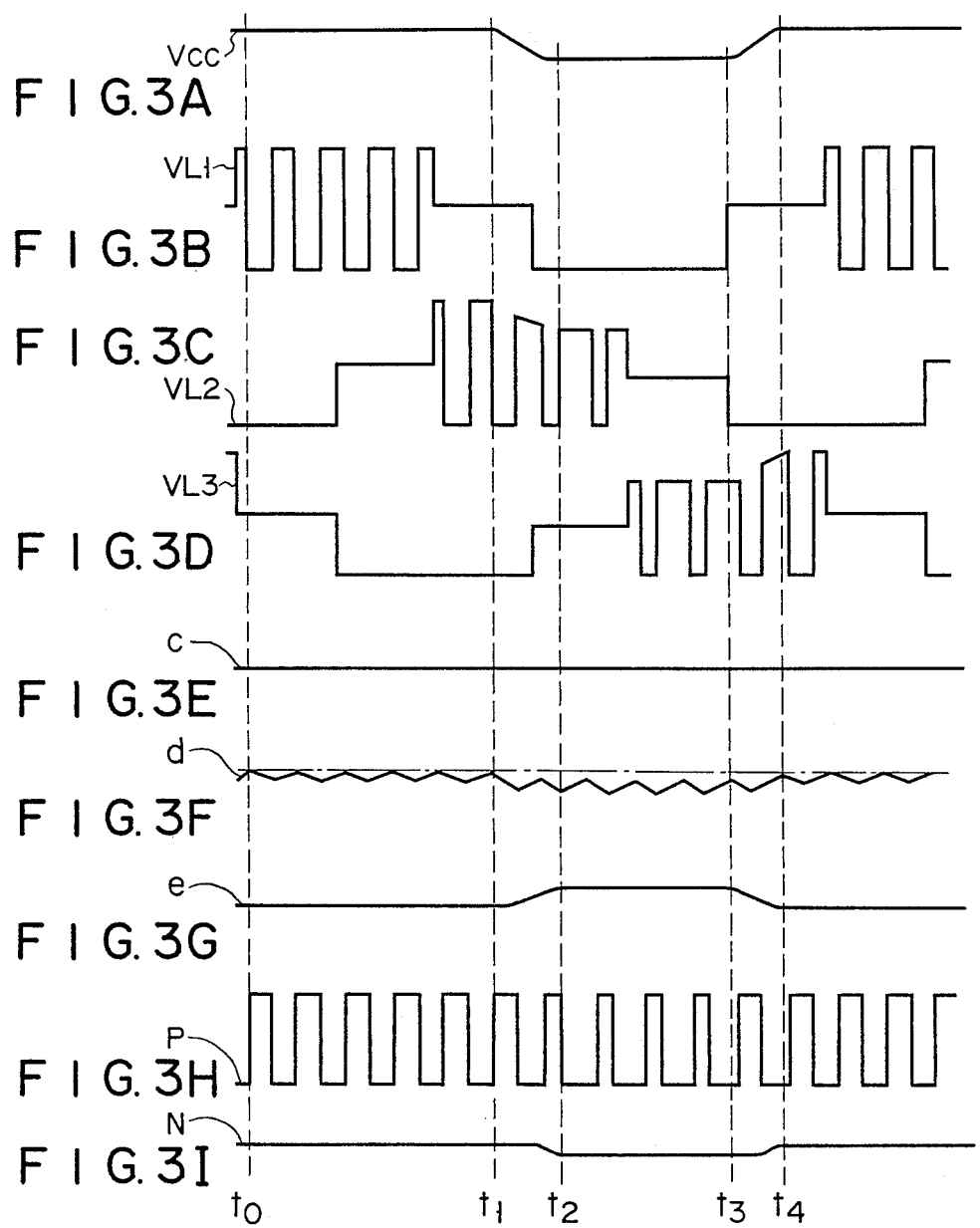
FIGS. 3A through 3I are diagrams illustrating voltage waveforms at the respective points in the circuit diagram of FIG. 2.

Assume that the voltage of DC power source 16 is constant between times $t_0$ and $t_1$ as shown in FIG. 3A. Then, during this interval, the voltages of the individual coils L1, L2 and L3 vary as shown in FIGS. 3B, 3C and 3D, and the output signal of IC 48 (i.e., the ON/OFF signal from signal generator 18) and the rotational speed of DC motor 12 are constant as shown in FIGS. 3H and 3I. And, the rotational speed and phase of DC motor 12 at this time are detected by IC 44, etc. and they are then compared with the speed reference signal and phase reference signal. These reference signals are acquired by the reference clock from crystal oscillator 46. The outputs AFC and APC are added by adder 28 constituted by resistors R6 and R7 and the resultant signal, control signal c, is input to operational amplifier 50 constituting subtracter 32.

The voltage supplied through switching circuit 14 to DC motor 12 from DC power source 16 is detected by voltage detector 30 that is constituted by diodes D1 to D3, resistors R3 to R5 and capacitor C1, and the output signal d of detector 30 is input to operational amplifier 50. Operational amplifier 50 in turn subtracts the output signal d from the control signal c and sends the resultant control signal e to input terminal $V_{IN}-$ of IC 48. Since the ON/OFF duties of the outputs $C_1$ and $C_2$ of IC 48 need not be varied during the interval between $t_0$ and $t_1$, the ON/OFF operation of switching circuit 14 does not change. Consequently, DC motor 12 keeps rotating at a constant speed.

Let us assume now that the voltage of DC power source 16 starts decreasing at time $t_1$; this may be caused by the influence of a load other than DC motor 12 such as a different motor (e.g., mixing motor) which is also coupled to DC power source 16. The reduction in source voltage decreases the voltage supplied to DC motor 12 through transistors Q8, Q10 and Q12 of switching circuit 14. Then, the voltages applied to coils L1 to L3 of DC motor 12 are rectified and smoothed by diodes, D1 to D3, resistors R3 to R5 and capacitor C1. That is, voltage detector 30 detects a signal proportional to the voltage supplied to DC motor 12. The detection signal d (see FIG. 3F) is input to operational amplifier 50.

At this time, the rotational speed and phase signals having frequency proportional to the rotational speed of DC motor 12, after being detected by IC 44, etc., are compared with the speed reference signal and phase reference signal, respectively. Then, the control signals a and b (outputs AFC and APC) from IC 44 are added by adder 28 constituted by resistors R6 and R7, and its resultant control signal c (see FIG. 3E) is input to operational amplifier 50.

Operational amplifier 50 in turn subtracts the output signal d from the control signal c. It should be noted that the output signal d starts gradually decreasing at time $t_1$ and the output of operational amplifier 50, or the control signal e, gradually increases as a consequence. This control signal e is input to input terminal $V_{IN}-$ of IC 48. IC 48 serving as signal generator 18 changes the ON/OFF duty cycles of outputs $C_1$ and $C_2$ in accordance with the value of the control signal e supplied to input terminal $V_{IN}-$, thus providing the output as shown in FIG. 3H. In other words, transistors Q1–Q6 constituting switching circuit 14 are rendered conductive or nonconductive by the ON/OFF signals from outputs $C_1$ and $C_2$ of IC 48, and transistors Q7–Q12 are also rendered conductive or nonconductive by the same signals, so as to control the gating of the current supplied to DC motor 12 from DC power source 16.

As a result, the output voltage N of DC motor 12 hardly varies as shown in FIG. 3I. The same signal processing is executed even during the interval between times $t_2$ and $t_3$ in which the voltage Vcc of DC power source 16 is the lowest. The rotational speed and phase of DC motor 12 are controlled by changing the ON/OFF duty cycles of outputs $C_1$ and $C_2$ of IC 48 in such a way as to increase the control signal e until time $t_4$ at which the voltage of DC power source 16 returns to the original level.

In this manner, the control signal e increases when the voltage supplied to DC motor 12 decreases due to reduction in voltage of DC power source 16. Accordingly, signal generator 18 increases the ratio of the ON signal to the OFF signal supplied to switching circuit 14, thereby increasing the ON time of switching circuit 14. On the other hand, when the voltage supplied to DC motor 12 increases due to an increase in voltage of DC power source 16, the control signal e decreases. Consequently, signal generator 18 decreases the ratio of the ON signal to the OFF signal supplied to switching circuit 14 so as to shorten the ON time of the switching circuit 14. At this time, given that the gain of voltage detector 30 is set to the proper value, a change in source voltage can be compensated by changing the ON/OFF duty of switching circuit 14.

As described above, even when the source voltage from the DC power source changes, the ON/OFF duty of switching circuit 14 can be changed before the rotational speed of DC motor 12 changes. In other words, by changing this ON/OFF duty cycle, the voltage supplied to DC motor 12 from DC power source 16 can be controlled and the rotational speed and phase of the motor can be controlled to approach the desired values accordingly. Therefore, it is possible to significantly reduce a change in rotational speed of the DC motor with respect to a change in source voltage. This can contribute to simplifying the power source in use, which may inevitably reduce the manufacturing cost of the apparatus and make the apparatus more compact and lighter.

Although the voltage of each phase (each coil) of a three-phase brushless motor is detected according to the above-described first embodiment, this embodiment is in no way limited to this particular case. For instance, this embodiment may be modified in such a way that it is sufficient to detect the voltage of at least one phase, not each phase, of the three-phase brushless motor.

In addition, the DC motor is not limited to this brushless type, but can be a brush motor instead.

A description of the second embodiment of this invention will be given below referring to FIG. 4 which illustrates the circuit configuration of the DC motor driving apparatus of FIG. 1 as applied to a single-phase brush motor. In FIG. 4, the same reference numerals as used in FIG. 1 are also used to denote the same or corresponding elements and a detailed description of these elements will be omitted here.

As shown in FIG. 4, a DC motor 60 is coupled through a transistor Q14 to DC power source 16, and is therefore supplied with the voltage from this DC power source 16. That is, transistor Q14 constitutes the aforementioned switching circuit 14.

The speed detection signal detected by a speed detector 62 and passing through resistors R1 and R2 and transistor Q13 is supplied from transistor Q13 to IC 44 further through noise removal filter 40 and wave shaper 42. This IC 44 receives the speed detection signal at its FG pulse input terminal $FG_{IN}$ and changes the outputs AFC (control signal a) and APC (control signal b) coming through output terminals AFC and APC in such a way that the speed detection signal becomes equal to the reference clock from crystal oscillator 46 coupled between a crystal oscillator terminals $X_1$ and $X_2$ which is subjected to frequency division. Speed detector 62, resistors R1 and R2, transistor Q13, filter 40, wave shaper 42 and IC 44 constitute the aforementioned rotational speed detector 20, speed comparator 24, phase detector 22 and phase comparator 26.

IC 48, which is an integrated circuit for a switching regulator, constitutes the aforementioned signal generator 18 and changes the ON/OFF duty cycles of outputs $C_1$ and $C_2$ in accordance with the value at input terminal $V_{IN}-$. The ON/OFF switching of transistor Q14 is executed by the ON/OFF signals from outputs $C_1$ and $C_2$ of IC 48 so that the ON/OFF control of the current to DC motor 60 from DC power source 16 is executed by switching circuit 14. After execution of the ON/OFF control, the voltage supplied to DC motor 60 is smoothed to be the signal d by resistors R3 to R5 and capacitor C1 which constitute voltage detector 30, and this signal d is then input to the minus input terminal of operational amplifier 50 serving as subtracter 32. IC 48 is supplied with the motor ON/OFF signal from an external unit (not shown) through soft start controller 52 that controls the soft start at the time of starting the motor.

The aforementioned outputs AFC and APC of IC 44 are added to be the control signal c by adder 28 which is constituted by resistors R6 and R7, and the signal c is supplied to a plus input terminal of operational amplifier 50. Operational amplifier 50 in turn subtracts the signal d from the control signal c and sends its output as the control signal e to input terminal $V_{IN}-$ of IC 48. This feedback control of the voltage supplied to DC motor 60 always sets the voltage to the motor 60 at a value corresponding to the speed control signal irrespective of a change in source voltage. Accordingly, stable speed control can always be realized.

In FIG. 4, reference numeral 54 denotes a current detector that detects the coil current of DC motor 60 and outputs the corresponding voltage signal, and reference numeral 56 denotes a reference voltage generator that generates a reference voltage for detecting an excess current at the time DC motor 60 is started or locked. The output voltages of the individual circuits 54 and 56 are respectively supplied to input terminals CL+ and CL− of IC 48 of an excess current detecting comparator provided within IC 48. The stopping operation, etc. of DC motor 60 is executed by detecting an excess current through this comparator. Reference numeral 58 is an input circuit of an amplifier provided within IC 48 to amplify the control signal e and the input circuit is coupled to input terminals $V_{IN}-$ and $V_{IN}+$ (input terminals of this amplifier) of IC 48.

The operation of thus constituted DC motor driving apparatus is the same as the operation of the first embodiment. When the voltage supplied to DC motor 60 decreases due to a reduction in voltage of DC power source 16, the signal (voltage value) detected by voltage detector 30 decreases in proportion to the supplied voltage. As a result, the difference between the output signal d and control signal c acquired in subtracter 32 increases, thereby increasing the control signal e. Accordingly, signal generator 18 increases the ratio of the ON signal to OFF signal supplied to switching circuit 14 constituted by transistor Q14, thus increasing the ON time of switching circuit 14. On the other hand, when the voltage supplied to DC motor 60 increases due to an increase in voltage of DC power source 16, the control signal e decreases. Accordingly, signal generator 18 reduces the ratio of the ON signal to OFF signal supplied to switching circuit 14, thus shortening the ON time of this circuit 14. At this time, provided that the gain of voltage detector 30 is set to the proper value, a change in source voltage can be compensated for by changing the ON/OFF duty of switching circuit 14.

Even when the source voltage varies, therefore, the ON/OFF duty of switching circuit 14 can be changed before the rotational speed of DC motor 60 changes. In this way, the voltage supplied to DC motor 60 from DC power source 16 can be controlled in such a way that the rotational speed and phase of the motor can be controlled to approach the desired values. Therefore, it is possible to significantly reduce a change in rotational speed of the DC motor with respect to a change in source voltage. This can permit simplification of the power source in use and can therefore contribute to reducing the manufacturing cost of the apparatus as well as making the apparatus more compact and lighter.

What is claimed is:

1. An apparatus for driving a DC motor for controlling the speed of said DC motor which is changed by energy supplied to said DC motor, comprising:
   means for providing said energy to said DC motor as a drive voltage;
   voltage detecting means, provided between a reference potential point and a stator of said DC motor, for detecting said drive voltage supplied to said DC motor;
   means for generating an electric signal corresponding to the rotational speed of said DC motor;
   first integrated circuit means, having a crystal oscillator, for comparing said electric signal from said signal generating means with a reference signal obtained by frequency-dividing an output signal of said crystal oscillator;
   synthesizing means for synthesizing a voltage detection signal from said voltage detecting means with a comparison result of said first integrated circuit means; and
   second integrated circuit means for generating a switching signal based on an output of said synthesizing means and supplying said switching signal to said energy providing means so as to compensate for a change in said drive voltage provided by said providing means.

2. An apparatus according to claim 1, wherein said energy providing means comprises:
   a DC power source for supplying said drive voltage; and
   means for varying the period for which said drive voltage is supplied from said DC power source to said DC motor.

3. An apparatus according to claim 1, wherein said voltage detecting means includes a smoothing circuit for smoothing said drive voltage supplied to said DC motor.

4. An apparatus according to claim 1, wherein said first integrated circuit means further includes:
   a phase detector for detecting a phase of a phase signal which has a frequency proportional to the rotational speed of said DC motor; and
   a phase comparator for comparing said phase signal detected by said phase detector with a phase reference signal from said crystal oscillator,
   whereby said first integrated circuit means synthesizes a comparison result of said phase detector and a result of comparing said electric signal with said reference signal and supplies a synthesized output to said synthesizing means.

5. An apparatus for driving a DC motor for controlling the speed of said DC motor which is changed by energy to be supplied to said DC motor, comprising:
   a Hall element provided in association with a winding of said DC motor to detect a rotor position of said DC motor;
   first integrated circuit means for detecting said rotor position of said DC motor upon reception of a voltage from said Hall element;
   switching means for performing a switching operation to supply a DC source voltage to said winding of said DC motor;
   voltage detecting means, provided between a reference potential point and said winding of said DC motor, for detecting a drive voltage to be supplied to said DC motor;
   means for generating an electric signal corresponding to the rotational speed of said DC motor upon reception of an output signal of said first integrated circuit means;
   second integrated circuit means, having a crystal oscillator, for comparing said electric signal from said signal generating means with a reference signal obtained by frequency-dividing an output signal of said crystal oscillator;
   synthesizing means for synthesizing a voltage detection signal from said voltage detecting means with a comparison result of said second integrated circuit means; and
   third integrated circuit means for generating a switching signal based on an output of said synthesizing means and supplying said switching signal to said switching means so as to compensate for a change in said drive voltage supplied by said switching means.

6. An apparatus according to claim 5, wherein said switching means comprises:
   a DC power source; and means for varying a period for which said DC source voltage is supplied.

7. An apparatus according to claim 5, wherein said voltage detecting means detects a voltage of at least one winding of said DC motor.

8. An apparatus according to claim 7, wherein said voltage detecting means includes at least one rectifier element for rectifying said drive voltage and one smoothing circuit for smoothing said drive voltage supplied to said DC motor.

9. An apparatus according to claim 5, wherein said second integrated circuit means further includes:

a phase detector for detecting a phase of a phase signal which has a frequency proportional to the rotational speed of said DC motor; and a phase comparator for comparing said phase signal detected by said phase detector with a phase reference signal from said crystal oscillator, whereby said second integrated circuit means synthesizes a comparison result of said phase detector and a result of comparing said electric signal with said reference signal and supplies an synthesized output to said synthesizing means.

* * * * *